United States Patent
Keller et al.

(10) Patent No.: US 11,447,116 B2
(45) Date of Patent: Sep. 20, 2022

(54) METHOD FOR DETECTING THE CLEARANCE OF A BRAKE OF A MOTOR VEHICLE, CONTROLLER, AND BRAKE HAVING SAME

(71) Applicant: WABCO Europe BVBA, Brussels (BE)

(72) Inventors: Marcus Keller, Weinheim (DE); Mirko Seip, Brombach (DE)

(73) Assignee: WABCO Europe BVBA, Brussels (BE)

( * ) Notice: Subject to any disclaimer, the term of this patent is extended or adjusted under 35 U.S.C. 154(b) by 190 days.

(21) Appl. No.: 16/062,929

(22) PCT Filed: Jan. 18, 2017

(86) PCT No.: PCT/EP2017/000053
§ 371 (c)(1),
(2) Date: Jun. 15, 2018

(87) PCT Pub. No.: WO2017/137140
PCT Pub. Date: Aug. 17, 2017

(65) Prior Publication Data
US 2018/0370518 A1    Dec. 27, 2018

(30) Foreign Application Priority Data
Feb. 11, 2016   (DE) .................... 10 2016 001 577.2

(51) Int. Cl.
*B60T 17/22*    (2006.01)
*F16D 55/225*   (2006.01)
(Continued)

(52) U.S. Cl.
CPC .......... *B60T 17/221* (2013.01); *F16D 55/225* (2013.01); *F16D 66/021* (2013.01);
(Continued)

(58) Field of Classification Search
CPC combination set(s) only.
See application file for complete search history.

(56) References Cited

U.S. PATENT DOCUMENTS

| 6,761,263 B2 * | 7/2004 | Becker ................... B65G 43/00 |
| | | 198/502.4 |
| 2003/0192747 A1 * | 10/2003 | Borugian ................ F16D 65/22 |
| | | 188/1.11 E |

(Continued)

FOREIGN PATENT DOCUMENTS

| DE | 3741050 A1 * | 6/1989 | ............. G01R 19/25 |
| DE | 4424270 A1 | 1/1996 | |

(Continued)

OTHER PUBLICATIONS

NPL English Translation of Fox (WO2008071577) (Year: 2008).*

(Continued)

*Primary Examiner* — James M McPherson
*Assistant Examiner* — Bakari Underwood
(74) *Attorney, Agent, or Firm* — Dickinson Wright PLLC

(57) ABSTRACT

A method (200) for detecting the clearance of a brake (100) of a motor vehicle, in particular a utility motor vehicle, includes the following steps: reading measurement signals of a wear sensor (115) disposed on the brake (100), determining an output signal value that is representative of the non-actuated state of the brake from the measurement signals, determining an event signal value that is representative of the braking state of the brake from the measurement signals, and determining the clearance from the difference between the event signal value and the output signal value, wherein the measurement signals of the wear sensor are examined for the presence of a characteristic signal oscillation that arises as a result of bringing into contact the brake
(Continued)

lining with the counterpart thereof that is to be braked. A controller (10) carries out the method on a brake (100).

19 Claims, 3 Drawing Sheets

(51) Int. Cl.
  *F16D 66/02*    (2006.01)
  *G01B 7/14*     (2006.01)
  *F16D 66/00*    (2006.01)
(52) U.S. Cl.
  CPC ............ *F16D 66/023* (2013.01); *G01B 7/14* (2013.01); *F16D 2066/003* (2013.01); *F16D 2066/006* (2013.01)

(56) References Cited

U.S. PATENT DOCUMENTS

| | | | | |
|---|---|---|---|---|
| 2007/0090828 | A1* | 4/2007 | Akerblom | G01B 7/14 324/207.22 |
| 2007/0208469 | A1* | 9/2007 | Wille | H04L 29/06 701/36 |
| 2013/0211683 | A1* | 8/2013 | Philpott | B60T 7/18 701/70 |
| 2014/0196994 | A1* | 7/2014 | Schneider | B60T 13/588 188/152 |
| 2015/0252861 | A1* | 9/2015 | Jantunen | B60T 13/743 324/537 |
| 2015/0330470 | A1* | 11/2015 | Siebke | F16D 55/2255 188/1.11 L |
| 2016/0123421 | A1* | 5/2016 | Staahl | B60T 17/221 188/1.11 L |
| 2018/0170340 | A1* | 6/2018 | Hecker | B60T 8/171 |

FOREIGN PATENT DOCUMENTS

| | | | |
|---|---|---|---|
| DE | 10005758 A1 | 8/2001 | |
| DE | 102008052845 A1 | 5/2009 | |
| DE | 102012102579 A1 | 9/2013 | |
| DE | 102013012104 A1 | 1/2015 | |
| EP | 0460376 A2 | 12/1991 | |
| EP | 2520817 A1 | 11/2012 | |
| WO | 03/016745 A2 | 2/2003 | |
| WO | WO-2008071577 A1 * | 6/2008 | ............ B60T 8/174 |
| WO | 2010/017998 A1 | 2/2010 | |

OTHER PUBLICATIONS

NPL English translation of Fuchs (DE3741050). (Year: 1989).*
"Francesco Massi, Contact surface topography and system dynamics of brake squeal, 2008, Wear 265 (2008) 1784-1792" (Year: 2008).*
European Patent Office, Rijswijk, Netherlands, International Search Report of International Application No. PCT/EP2017/000053, dated May 31, 2017, 2 pages.

* cited by examiner

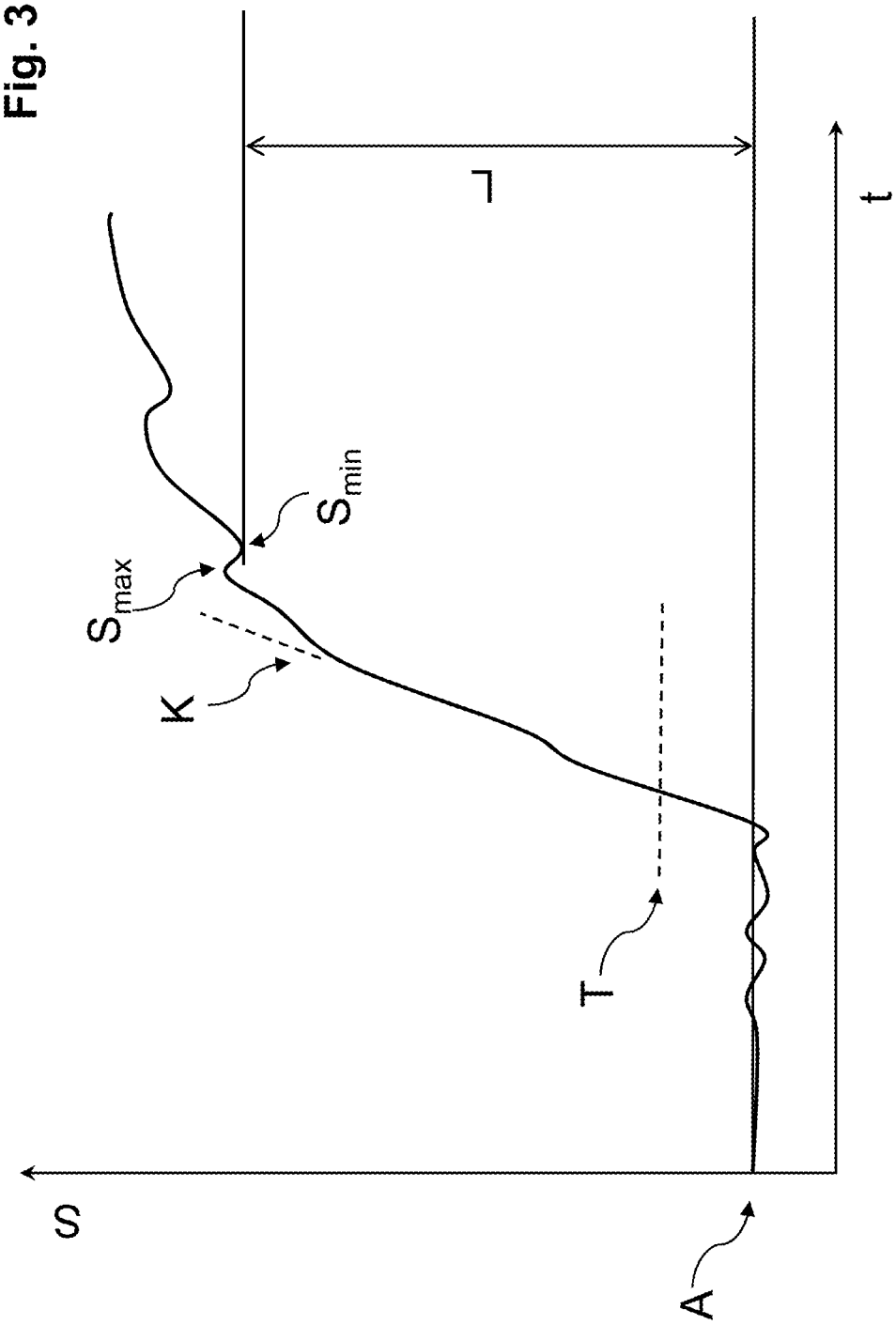

METHOD FOR DETECTING THE CLEARANCE OF A BRAKE OF A MOTOR VEHICLE, CONTROLLER, AND BRAKE HAVING SAME

TECHNICAL FIELD

The present application concerns a method for detecting the clearance of a brake of a motor vehicle, in particular a utility motor vehicle. The invention further concerns a controller for detecting the clearance of a brake of this type, and a brake of this type.

BACKGROUND

Methods for detecting clearance are generally known in the field of motor vehicles, in particular utility vehicles. Thus for example, EP 2 520 817 A1 discloses a method of this type. The object is generally to determine, by the clearance detection, the extent to which the brake lining used in the brake is worn, or whether the brake is working as intended.

It is a challenge to extract data from the sensors available in the motor vehicle with sufficient reliability and accuracy that can be used for detecting the clearance. EP 2 520 817 A1 proposes to use the wear sensor of the brake for this. In particular, it is proposed via the wear sensor to measure the distance moved by a feed unit at a first point in time when the brake is not actuated, and to measure again at a second point in time when the brake is actuated. From the difference of the two measured displacements, a value is then directly determined that will represent the clearance.

However, there is a significant disadvantage here that the determined value does not reflect the actual clearance with sufficiently high accuracy. Rather, the determined value is corrupted by disruptive influences. For example, displacements of the feed unit of up to 2 mm are caused by the elastic caliper expansion of the brake system alone, so that a correct determination of the clearance, which in practice mainly lies below 1 mm, is not possible without taking into account other auxiliary variables that help to define overcoming the clearance.

SUMMARY OF THE INVENTION

Against this background, it is the object of the present application to specify an option for detecting the clearance that enables reliable detection of the clearance at the lowest possible equipment costs with very high accuracy.

The present disclosure achieves the object thereof with a method of the type referred to above with the steps:
reading out measurement signals of a wear sensor that is disposed on the brake,
determining an output signal value that is representative of the non-actuated state of the brake from the measurement signals,
determining an event signal value that is representative of the braking state of the brake from the measurement signals, and
determining the clearance from the difference between the event signal value and the output signal value, wherein the measurement signals of the wear sensor are examined for the presence of a characteristic signal oscillation that arises as a result of bringing the brake lining into contact with the counterpart thereof that is to be braked.

The present disclosure concerns both disk brakes and drum brakes, wherein in the case of a disk brake the counterpart corresponding to the brake lining is the brake disk, and in the case of a drum brake it is the brake drum.

The wear sensor measures in a generally known way for example the stroke of the feed unit, a plunger or an angular movement of a suitably linked component in the force train of the brake system. According to the invention, the output signal value means the measurement signal plateau of the wear sensor when the brake is not being actuated. This value shifts through progressive wear of the brake linings in the course of time. According to the invention, the event signal value means the signal value at which it can be assumed with confidence that the brake lining and the counterpart thereof have been brought into contact with each other so that there can be no further play.

The present disclosure makes use of the knowledge that the wear sensor is already a highly sensitive measuring instrument that can be analyzed beyond the pure measurement of an actuation path using the time profile of the signal. A variation of the mechanical structure, such as occurs in particular by bringing the brake lining and the counterpart into contact, acts directly on the signal profile of the output signal of the wear sensor. According to the invention, it has been recognized that whenever a brake lining and counterpart have been brought into contact with each other, and the play in the brake system has been taken up, a characteristic oscillation occurs in the signal profile. The present disclosure starts here and identifies this signal oscillation in the signal profile. Because the focus according to the present disclosure is directed to the analysis of the measurement signal of the wear sensor, disturbance variables such as elastic caliper expansion can be excluded as disturbance variables.

The present disclosure is advantageously developed by the characteristic oscillation being formed of a local signal maximum and a local signal minimum that is temporally adjacent thereto, wherein the signal value of the signal minimum is set as the event signal value. This is so that the theoretical play or the theoretical clearance is already slightly overcome before the occurrence of the characteristic oscillation. This shows up in the time profile of the signal of the wear sensor as a slight attenuation of the rise of the signal. The attenuation, however, cannot be located in the signal profile with satisfactory repeat accuracy. But because the characteristic oscillation described above always occurs shortly after the first flattening of the increase in the signal value, by identifying the characteristic oscillation and owing to the arbitrary determination of the signal minimum as the event signal value, a value for the clearance can be determined with high repeat accuracy that is very close to the actual (theoretical) clearance.

If for example a disk brake with a plunger is considered, whereby the wear sensor directly measures the travel of the plunger, a slight flattening in the signal profile may occur once the plunger contacts the brake lining, and a further flattening once the brake lining makes a first contact with the brake disk, having moved away from the plunger. The pressure point of the brake, at which the brake lining starts "to grip", starts immediately thereafter however, and the pressure point becomes visible in the form of the characteristic oscillation in the signal profile of the wear sensor.

In one example of the method, the output signal value is determined by averaging measurement signals that have been read out over a predetermined period of time and by temporarily storing the average value. The formation of the average value is used on the one hand for signal smoothing, and on the other hand can be used to filter noise signals out of the signal profile. When the brake is not actuated, because of very different operating conditions the signal value that is transmitted by the wear sensor is never exactly constant, but moves within a defined tolerance band. If for example the predetermined time in which the measurement signals are averaged is set to 0.05 sec., and if the wear sensor samples at a frequency of 100 Hz, each average value is formed over five successive individual measurements.

The frequency and the period of time to be determined can be adjusted depending on the desired smoothing.

In a further example of the method, the step of determining the event signal value is carried out once the measurement signal that has been read out exceeds the output signal value by a predetermined trigger value. This is intended to prevent an oscillation event in the signal profile that only results from external disturbances from being incorrectly identified as overcoming the clearance. The predetermined trigger value preferably lies in a range of signal values that is within a range from 20%-50% of the design-related clearance once converted into the actuation travel of the component that is measured by the wear sensor.

In one example of the method according to the invention, determining the event signal value includes determining the measurement signal as a function of time, forming a first time derivative of the measurement signal, and forming a second time derivative of the measurement signal. From these three functions, the signal maximum, and above all the signal minimum, can be determined in the approach with low computing complexity. The signal minimum is determined here as the signal value at which the first time derivative of the measurement signal equal zero, and the second time derivative of the measurement signal is greater than zero. Similarly, the signal value at which the first time derivative of the measurement signal equals zero and the second time derivative of the measurement signal is less than zero is determined as the signal maximum. In principle, the signal value that is at the signal maximum could also be used as the event signal value. However, when overcoming the signal maximum, at least one of the components is already slightly elastically deformed. The signal minimum is therefore to be located closer to the actual theoretical clearance.

In a further preferred embodiment, the step of determining the output signal value is carried out once braking of the motor vehicle is finished. In particular, the step is carried out once the measurement signal value that has been read out is less than the trigger value. The orientation to the trigger value is considered to be a simple processing technology option. Usually, the output signal value that is determined and temporarily stored before the braking process is not reached exactly again after completion of the braking, since wear occurs on the brake lining as a result of the braking.

The method according to the present disclosure is advantageously developed by including the steps:
  providing a limit value for the maximum permissible clearance of the brake,
  comparing the determined clearance with the limit value, and
  providing a warning signal if the clearance exceeds the limit value.

The warning signal can preferably be provided in the form of a characteristic data signal with a predetermined code, as an audible or visual warning signal or as a combination of a plurality of or all forms of signal.

In one example, the initially described method is developed into a method for automatic adjustment of the clearance of a brake of a motor vehicle, in particular a utility motor vehicle, by the method additionally including the steps of the examples described above:
  providing a setpoint value for the clearance of the brake,
  comparing the determined clearance with the setpoint value, and
  determining a correction value as the difference between the determined clearance and the setpoint value.

Further preferably, for automatic adjustment the method includes:
  providing the correction value via a data interface to a preferably electrical adjustment unit of the brake, and
  adjusting the clearance of the brake by the provided correction value.

Providing the correction value is preferably carried out once the difference exceeds a predetermined threshold, and/or once the determined correction value is confirmed within a predetermined tolerance band once or more times in successive measurements. The rule that a correction value cannot only be determined once, but that the value must be repeatedly determined a number of times, ensures that no unreasonable "false positive" correction values are output to the data interface, but a correction value is only provided if a trend of a varied clearance has actually been determined and confirmed. In particular, in those embodiments in which a manual adjustment of the clearance or a mechanical adjustment of the clearance is to be carried out, it is preferred if the number of necessary correction interventions is reduced to a reasonable level, so that a correction demand in the form of the correction value is only signaled if the value is also significant.

Where measurement signals are mentioned in the previous and subsequent text, this means voltage or current signals, depending on the selected wear sensor. The wear sensor preferably comprises a travel measurement sensor and/or an angle measurement sensor. Further preferably, the measurement signals of the wear sensor vary linearly proportionally with the detected travel or angular path.

The present disclosure further achieves the object thereof by specifying a controller for detecting the clearance of a brake of a motor vehicle, in particular a utility motor vehicle, with a processor, a data memory and a data interface, wherein a computer program for carrying out the method according to any one of the examples described above is stored in the data memory, and wherein the processor is arranged to carry out a plurality of or all of the steps of the method. The controller provides a standalone solution to providing clearance detection in motor vehicles with wear sensors. The controller is preferably arranged to provide at least one of the following at the data interface:
  signal values representative of the clearance of the brake,
  a warning signal on exceeding a predetermined limit value for the clearance, or
  determined correction values for adjustment of the clearance.

Further preferably, the data interface of the controller is arranged for direct communications with an adjustment unit, preferably an electrical adjustment unit, or for communications with a bus system of the motor vehicle. In particular by communications with the bus system of the motor vehicle, the signal value or characteristic value relating to the clearance can be provided to suitable vehicle electronics for diagnostic purposes. Detection of malfunctions of the brake or the wear sensor can also be carried out via the bus system.

The present disclosure further achieves the object thereof in the case of a vehicle brake of the aforementioned type with a wear sensor by comprising a controller for detecting the clearance of the brake, wherein the wear sensor has a signal communication connection to the controller, and by the controller being embodied according to any one of the examples described above.

The advantages according to the present disclosure of the method described above apply in the same way to the controller and the vehicle brake, and vice versa. examples of the method according to the present disclosure are at the same time examples of the computer program that is stored in the data memory of the controller.

Exemplary embodiments of the present disclosure are now described below using the drawings. The drawings are not necessarily intended to represent the exemplary embodiments to scale. Rather, where useful for the description, the drawing is implemented in a schematic and/or slightly distorted form. With regard to additions to the lessons that can be taken directly from the drawings, we refer to the relevant prior art. In doing so, it is to be taken into account that numerous modifications and changes relating to the form and the detail of an embodiment can be carried out without departing from the general idea of the invention. The features of the present disclosure that are disclosed in the description, in the drawings and in the claims can be significant for the development of the present disclosure both individually and also in any combination. In addition, all combinations of at least two features that are disclosed in the description, the drawings and/or the claims fall within the scope of the invention. The general idea of the present disclosure is not limited to the exact form or the detail of the examples that are shown and described below or limited to a subject matter that would be limited compared to the subject matters claimed in the claims. In the case of the claimed dimensional ranges, values lying within the mentioned limits shall also be disclosed and can be optionally used and claimed as limit values. For reasons of simplicity, the same reference characters are used below for identical or similar parts or parts with identical or similar functions.

BRIEF DESCRIPTION OF THE DRAWINGS

Further advantages, features and details of the present disclosure arise from the following description of the preferred embodiments, and using the following figures. In the figures in detail:

FIG. 3 shows a signal profile that is analyzed in the method according to the invention.

DETAILED DESCRIPTION OF THE DRAWINGS

Figure 1:
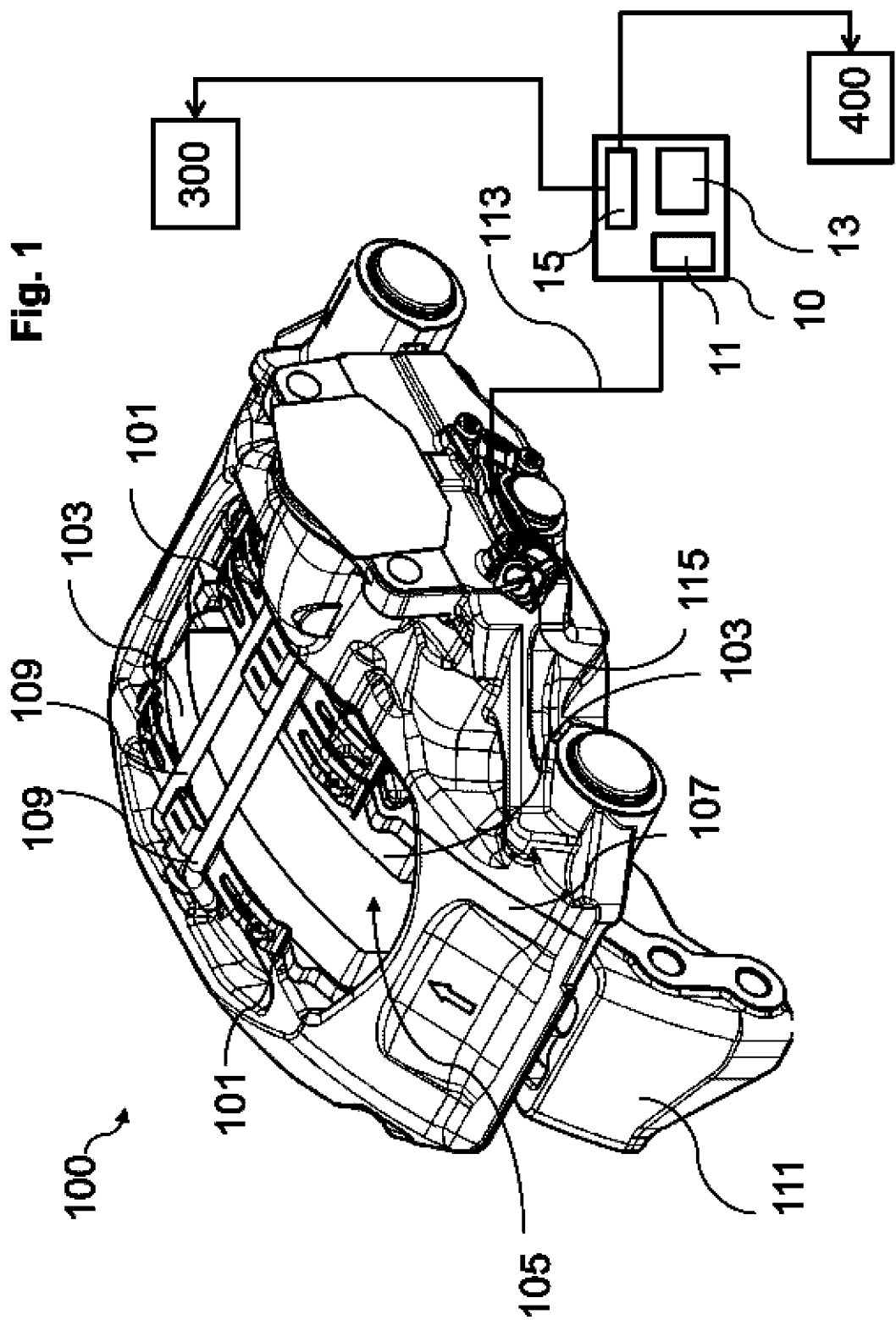
FIG. 1 shows a schematic representation of a vehicle brake according to the present disclosure with a controller according to the invention.

According to FIG. 1, the brake 100 according to the invention, which in this exemplary embodiment is implemented as a disk brake, and which is embodied for use in a utility motor vehicle, comprises a brake disk 105 (shown indicated) and two brake linings 103 that are disposed on opposite sides of the brake disk 105, wherein the brake disk 105 and the brake linings 103 can be moved relative to each other. At least one brake lining 103 is retained by a lining carrier.

The disk brake further comprises a brake caliper 107, which slides axially on guide bolts of a brake support 111. The brake linings 103 are guided axially movably and are supported in the brake support 111. The retention of the brake linings 103 is carried out by a retaining clip 109 and by retaining springs 101.

A wear sensor 115 that measures the actuation travel of a plunger (not shown) is disposed in the brake caliper 107. The wear sensor 115 is connected to a controller 10 via a signal communication connection 113, which can optionally be embodied in a wireless or cabled form.

The controller 10 comprises a processor 11, a data memory 13 and a data interface 15. The controller is arranged to carry out a method 200 (FIG. 2) via a computer program stored in the data memory 13. The signal values, clearance values, correction values and/or warning signals that are determined with the method 200 are output by the controller 10 via the data interface 15, for example to an electronic adjustment unit 300 or to a bus system 400 of the motor vehicle.

Figure 2:
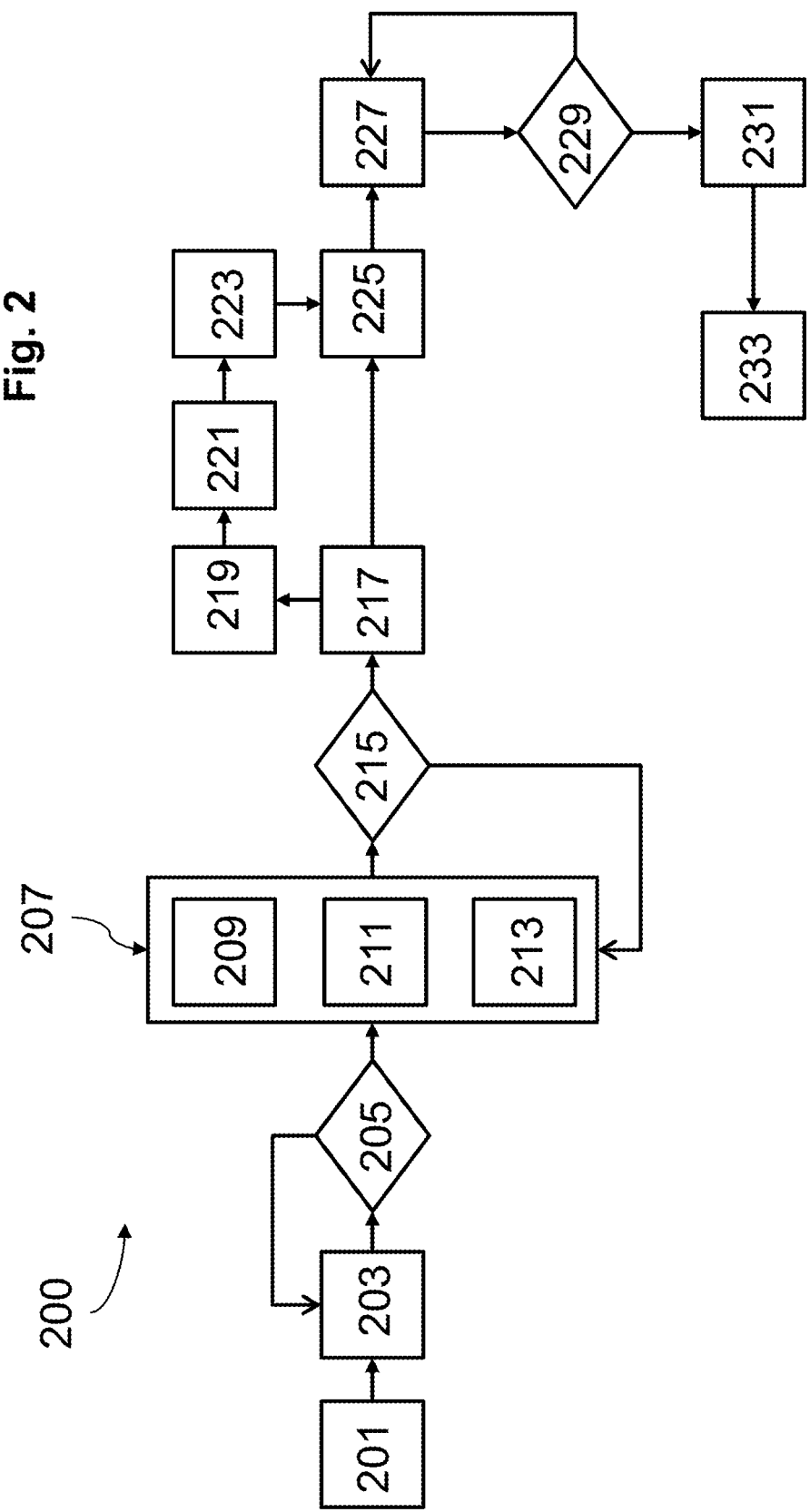
FIG. 2 shows a schematic representation of the method according to the invention.

FIG. 2 shows schematically a process of the method according to the present disclosure in a preferred exemplary embodiment. As the adopted start of the method, in step 201 measurement signals of a wear sensor that is disposed on the brake are read, for example by the controller 10.

In step 203, an output signal value is determined, preferably by the processor 11 of the controller 10, wherein the output signal value is representative of the non-actuated state of the brake. The determination is carried out from the measurement signals that were previously read out in step 201. A plurality of measurement signals is preferably combined into average values in step 203.

In step 205 a check is carried out, preferably by the controller 10, as to whether the current measurement signal that has been read out exceeds the output signal value determined in step 203 by a predetermined trigger value. If this is not the case, determining the output signal value and reading the measurement signals are abandoned.

If the current measurement signal that has been read out has exceeded the determined output signal value by the predetermined trigger value, the event signal value that is representative of the braking state of the brake is determined in step 207, preferably by the controller 10.

The step of determining the event signal value preferably includes forming a function of the signal profile against time in step 209, forming a first time derivative of the measurement signal in step 211, and forming a second time derivative of the measurement signal in step 213, wherein the steps can be carried out sequentially.

Based on the foregoing determination, a check is then carried out in step 215, preferably by the controller 10, as to whether a characteristic oscillation is formed by a time sequence of a local signal maximum and a local signal minimum. As long as no pair of values from the first and second temporal transformations of the measurement signal from the steps 211, 213 has been identified, for which the first time derivative of the measurement signal is zero and the second time derivative of the measurement signal is greater than zero, the generation of the derivatives carried out in step 207 is continued. Once the aforementioned criteria are satisfied, then starting from step 215, in step 217 a clearance is determined from the difference between the determined event signal value and the output signal value, preferably by the controller 10. Optionally, starting from step 217 a limit value for the maximum permissible clearance is then provided in step 219. In step 221, the provided limit value is compared with the determined clearance. If the clearance exceeds the limit value, a warning signal is provided in step 223.

Optionally, immediately after providing the warning signal, or already after determining the clearance in step 217, the method is continued by providing a setpoint value for the clearance of the brake in step 225, preferably by the controller 10.

In step 227, the determined clearance is compared with the setpoint value, and a correction value is determined as the difference between the determined clearance and the setpoint value, preferably by the controller 10.

In step 229 a check is carried out as to whether the previously determined correction value exceeds a predetermined threshold and/or whether the determined contour value can be confirmed within a predetermined tolerance band once or more times in successive measurements. If this is not the case, the method continues with the determination of the correction value in step 227. If however, the correction value has been confirmed or has exceeded a defined threshold, providing the correction value to the preferably electrical adjustment unit 300 of the brake or the bus system 400 of the motor vehicle is carried out in step 231, preferably via the data interface 15. In step 233, the clearance of the brake is adjusted by the previously provided correction value, for example by the adjustment unit 300.

Although the controller 10 has been described as a component of the vehicle brake 100 in the present exemplary embodiment, it should nevertheless be understood that the controller 10 also embodies the character of the present disclosure as a standalone functional unit.

In FIG. 3, the signal profile against time of the signals S output by the wear sensor 115 is shown by way of example. The time axis t can for example comprise milliseconds or seconds as the unit. The signal axis S can for example directly show the measurement signal unit (for example [mV] or [mA]) or the already converted sensor travel corresponding to the measurement signal, the unit of which could for example be [mm]. The qualitative profile, onto which the focus is directed below, is relevant.

With the brake initially not actuated, the signal value S oscillates on a measurement signal plateau about an output signal value A that is determined by continuous measurement, and optionally by the formation of the average value. With actuation of the brake, the wear sensor 115 outputs signal values S that increase against time t. The determination of the event signal value is preferably started from when a trigger threshold T is exceeded. The signal profile S(t) is examined by the controller 10 regarding the gradient and curvature behavior thereof. In the signal profile S(t), a first contact between the brake lining and the counterpart thereof is identified by K. There is an attenuated signal profile S(t) here, but not yet a characteristic oscillation. The characteristic oscillation occurs shortly thereafter when the brake lining is in full contact with the counterpart. The characteristic oscillation is formed by a local signal maximum $S_{max}$ followed by a local signal minimum $S_{min}$. At the signal minimum $S_{min}$, the gradient of the signal curve is zero, and the curvature is positive. The contact state can be definitely determined from the signal profile. The event signal value is determined as the end point of the clearance stroke. The difference between the output signal value A and the local minimum $S_{min}$ that is determined as the event signal value results from the clearance L detected by the controller 10. In the graphs according to FIG. 3, it can be seen that the local signal minimum $S_{min}$ gives a somewhat larger clearance than would theoretically exist at the point K. In practice however, the clearance L determined as described above only differs by a few tenths of millimeters at most from the theoretical clearance, so that the choice of the signal minimum $S_{min}$ represents an advantageous compromise, which can be determined with greater repeat accuracy in the signal profile S(t) than a point K would be.

While the above description constitutes the preferred embodiments of the present invention, it will be appreciated that the invention is susceptible to modification, variation and change without departing from the proper scope and fair meaning of the accompanying claims.

The invention claimed is:

1. A method for detecting a clearance of a brake of a motor vehicle, the method comprising the following steps:
   reading measurement signals of a wear sensor disposed on the brake,
   determining an output signal value representative of a non-actuated state of the brake from the measurement signals,
   determining an event signal value representative of a braking state of the brake from the measurement signals, and
   determining the clearance from the difference between the event signal value and the output signal value, wherein
   wherein the event signal value indicates a signal profile caused by a characteristic signal oscillation that arises whenever a brake lining is brought into contact with a counterpart thereof that is to be braked.

2. The method as claimed in claim 1, wherein the characteristic oscillation is formed by a local signal maximum and a temporally adjacent local signal minimum and the signal value of the signal minimum is set as the event signal value.

3. The method as claimed in claim 1, wherein the output signal value is determined by averaging the measurement signals that have been read out over a predetermined period of time and the average value is stored temporarily.

4. The method as claimed in claim 1, wherein the step of determining the event signal value is carried out once one of the read measurement signals exceeds the output signal value by a predetermined trigger value.

5. The method as claimed in claim 1, wherein determining the event signal value includes:
   detecting the measurement signals as a function of time,
   forming a first time derivative of the measurement signals, and
   forming a second time derivative of the measurement signals.

6. The method as claimed in claim 5, wherein a signal minimum is determined as a signal value for which
   the first time derivative of the measurement signal is zero, and
   the second time derivative of the measurement signal is greater than zero.

7. The method as claimed in claim 1, wherein the step of determining the output signal value is carried out again once braking of the motor vehicle has ended.

8. The method as claimed in claim 1, further including:
   providing a limit value for a maximum permissible clearance of the brake,
   comparing the determined clearance with the limit value, and
   providing a warning signal when the clearance exceeds the limit value.

9. The method as claimed in claim 1, and further comprising:
   providing a setpoint value for the clearance of the brake,
   comparing the determined clearance with the setpoint value, and determining a correction value as the difference between the determined clearance and the setpoint value.

10. The method as claimed in claim 9, further including the following steps:
providing the correction value via a data interface to an electrical adjustment unit of the brake, and
adjusting the clearance of the brake by the provided correction value.

11. The method as claimed in claim 1, wherein the measurement signals are voltage signals or current signals.

12. A controller for detecting the clearance of a brake of a motor vehicle, comprising:
a processor,
a non-volatile data memory, on which a computer program is stored that causes the processor to carry out the following method steps:
reading measurement signals of a wear sensor disposed on the brake,
examining the measurement signals of the wear sensor for a presence of a signal profile caused by a characteristic signal oscillation that arises whenever a brake lining is brought into contact with a counterpart thereof that is to be braked;
determining an output signal value representative of a non-actuated state of the brake from the measurement signals,
determining an event signal value representative of a braking state of the brake from the measurement signals based on the signal profile caused by the presence of the characteristic signal oscillation, and
determining the clearance from the difference between the event signal value and the output signal value, and
a data interface.

13. The controller as claimed in claim 12, wherein the controller is arranged to provide at least one of the following to the data interface:
signal values representative of the detected clearance of the brake,
a warning signal on exceeding a predetermined limit value of the clearance, or
determined correction values for adjustment of the clearance.

14. The controller as claimed in claim 12, wherein the data interface is arranged for communications with an adjustment unit, directly or via a bus system of the motor vehicle.

15. A vehicle brake comprising:
a wear sensor, and
a controller for detecting the clearance of the brake, wherein the wear sensor has a signal communication connection to the controller and the controller comprises:
a processor,
a non-volatile data memory, on which a computer program is stored that causes the processor to carry out the following method steps:
reading measurement signals of the wear sensor,
examining the measurement signals of the wear sensor for a presence of a signal profile caused by a characteristic signal oscillation that arises whenever a brake lining is brought into contact with a counterpart thereof that is to be braked;
determining an output signal value representative of a non-actuated state of the brake from the measurement signals,
determining an event signal value representative of a braking state of the brake from the measurement signals based on the signal profile caused by the presence of the characteristic signal oscillation, and
determining the clearance from the difference between the event signal value and the output signal value, and
a data interface.

16. The method as claimed in claim 1, wherein the measurement signals represent a travel or angle measurement.

17. The method as claimed in claim 1, wherein the measurement signals are in linear correlation with a detected travel or with an angular path.

18. The method as claimed in claim 1, wherein the signal profile is the signal profile of the wear sensor, and the signal oscillation is detected via the wear sensor in response to full contact between the brake lining and the counterpart.

19. The method of claim 1, wherein the characteristic oscillation defines the event signal value and the characteristic oscillation is a vibration that occurs as braking contact is maintained between the brake lining and the counterpart thereof during a given brake actuation.

* * * * *